G. T. PARRY & W. S. WARNER.
HEATING OIL WELLS BY ELECTRICITY.
No. 48,584. Patented July 4, 1865.
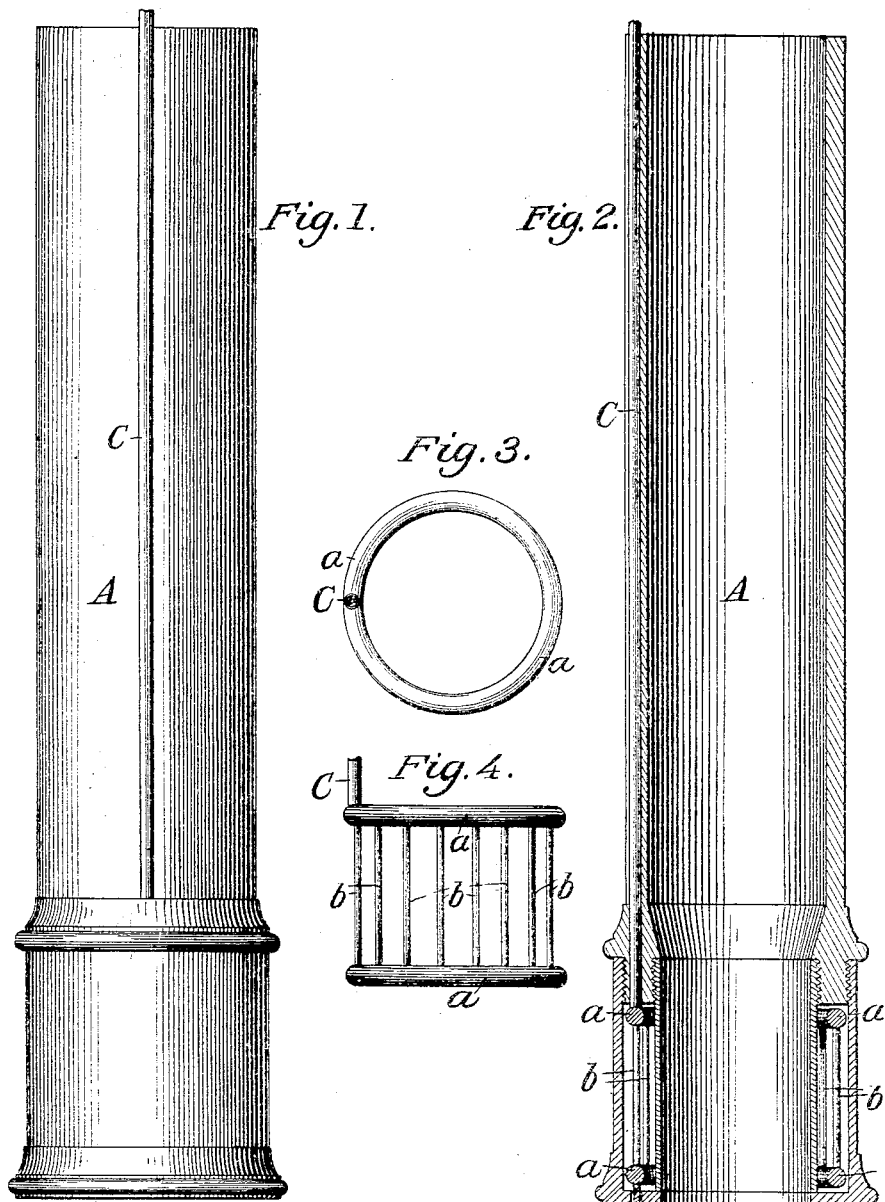

UNITED STATES PATENT OFFICE.

GEO. T. PARRY AND WM. S. WARNER, OF PHILADELPHIA, PENNSYLVANIA.

IMPROVEMENT IN HEATING OIL-WELLS BY ELECTRICITY.

Specification forming part of Letters Patent No. 48,584, dated July 4, 1865.

*To all whom it may concern:*

Be it known that we, GEORGE T. PARRY and WILLIAM S. WARNER, of the city and county of Philadelphia, State of Pennsylvania, have invented a new Electrical Heater for Oil-Wells; and we do hereby declare that the following is a full, clear, and exact description thereof, reference being had to the accompanying drawings, making a part of this specification, in which—

Figure 1 represents a short section of an oil-well tube having the heater applied to it. Fig. 2 is a diametrical section through Fig. 1, showing the interior of the heating-box. Figs. 3 and 4 show the cage for disturbing the passage of the electrical current.

Similar letters of reference indicate corresponding parts in the several figures.

It frequently happens, in the operation of obtaining oil from oil-wells, that the tube or hollow shaft which leads down into the well becomes obstructed in consequence of the oil becoming thick and viscous, and for this reason the flow of the oil from the well is checked or considerably diminished.

To remedy this difficulty, and to keep the oil about the lower end of the tube, as well as that which is flowing through the tube, in a fluid state, the nature of our invention consists in the application of heat produced by interrupting currents of electricity while passing through conductors to the tube of the well at such points thereof as may be found necessary, to prevent an accumulation or interruption of the oil in its passage out of the well.

When electricity is interrupted in its course through a conductor intense heat is evolved, and rods of metal may in this way be heated to redness and kept in this state as long as the current of electricity is continued. This heating principle we desire to take advantage of for dissolving or rendering fluid the thickened paraffine or other matters in this oil during the operation of obtaining it from wells; and for this purpose we have constructed a circuit-interrupter in the form of a cage and arranged it around the lower end of the tube which conducts the oil to the surface of the well. This cage may be composed of two copper rings, *a a*, connected together by means of rods or strips *b b b*, of platina or any other metal which is inferior in its conducting-power to that of copper. Or, if desired, the cage may be made in the form of a coil, or of a number of coils, of round or square wire, or of thin strips disposed in any other suitable manner. This cage may be confined closely within an annular chamber which is formed around the central opening through the tube A, if danger should be apprehended from explosion in consequence of an ignition of gas in the well. Such a chamber is represented in Fig. 2, with the cage above referred to arranged within it and insulated from the tube A, so that this tube will not conduct off the electricity from the copper rings *a a*.

The wire or bundle of wires C (shown in Figs. 1 and 2) should be properly insulated and connected to the upper or lower ring of the cage, and from this ring carried to the top of the well and connected to a battery or to an electrical machine.

The electricity, which may be obtained in any convenient manner, is conducted down the insulated wire C to the copper ring *a*, and around this ring. It thence finds its way down the rods or strips *b* to the lower ring, from which it may be conducted off to the earth in any suitable manner. In consequence of the interruption of the current of electricity in its passage from the good conductor or ring *a* over the inferior conductors *b b*, these latter will become red-hot, and the heat thus evolved will be communicated to the surrounding walls of the chamber which incloses the cage. These walls will in this manner become sufficiently hot to keep the paraffine about the bottom of the tube A in a liquid state, and thus prevent the choking of the lower end of the tube by thickened paraffine or other substance which is soluble by heat.

If desirable, heat may be applied in this manner to any other point or points of the well-tube above its lower end.

We have thus given a description of the most preferable mode of carrying out our invention; but we do not confine ourselves to the use of the contrivances herein specified, as other plans may be successfully employed, depending for their operation upon the principles herein set forth.

Having thus described our invention, what we claim as new, and desire to secure by Letters Patent, is—

1. Employing the heating power of electricity for the purpose of liquefying and accelerating the flow of oil from oil-wells, substantially as described.

2. Inclosing the circuit-interrupter or electrical heater within a tight chamber, substantially as herein described.

Witness our hands, in the matter of our electrical heater for oil-wells, this 9th day of March, 1865.

GEORGE T. PARRY.
W. S. WARNER.

Witnesses:
THEODORE ADAMS,
CHAS. WELDING,
EYRE KEYSER.